P. C. HEWITT.
ELECTRIC LIGHTING APPARATUS.
APPLICATION FILED FEB. 23, 1910.
1,064,688.
Patented June 10, 1913.
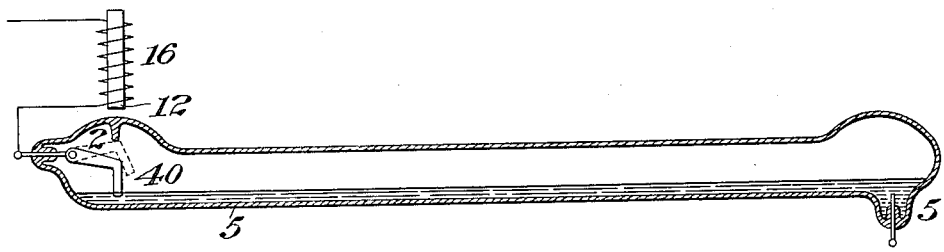
WITNESSES:
Chas. F. Clagett
Thos. H. Brown
INVENTOR
Peter Cooper Hewitt
BY
Charles A. Terry
ATTORNEY

UNITED STATES PATENT OFFICE.

PETER COOPER HEWITT, OF RINGWOOD MANOR, NEW JERSEY, ASSIGNOR, BY MESNE ASSIGNMENTS, TO COOPER HEWITT ELECTRIC COMPANY, OF HOBOKEN, NEW JERSEY, A CORPORATION OF NEW JERSEY.

ELECTRIC-LIGHTING APPARATUS.

1,064,688.   Specification of Letters Patent.   Patented June 10, 1913.

Original application filed March 23, 1901, Serial No. 52,488. Divided and this application filed February 23, 1910. Serial No. 545,290.

*To all whom it may concern:*

Be it known that I, PETER COOPER HEWITT, a citizen of the United States, and resident of Ringwood Manor, county of Passaic, State of New Jersey, have invented certain new and useful Improvements in Electric-Lighting Apparatus, of which the following is a specification.

My invention relates to that class of electric apparatus in which the conducting medium is a vapor or gas.

The apparatus may be used as a lamp or source of light or for various other purposes.

In certain patents issued to me on the 17th day of September, 1901, for example, United States Patents #682,690 and 682,695, I have described various forms of vapor or gas electric lamps, and the present invention relates more particularly to means for conveniently starting and operating lamps or other gas or vapor electric apparatus in which the phenomena at the negative electrode constitute an important part of the resistance to starting.

I have found that in an apparatus having a vapor or gas path intervening between the negative and positive electrode, under certain conditions of purity, there is an apparent reluctance on the part of the current to enter the negative electrode. I have further found that the tendency of the current is to assume a path between the positive electrode and that portion of the negative electrode which is remote therefrom. For instance, in a tube of considerable length constituting the inclosing chamber of the device, if a conducting rod constituting an extension of the negative electrode be extended through a considerable portion of the length of the tube, the current will enter the negative electrode at a point, generally speaking, as remote as possible from the positive electrode, instead of traversing the extended conductor. The exact explanation of this phenomenon is not essential to a description of my invention. From experiments which I have made, however, I believe that it is proven beyond reasonable doubt that the current tends to remain in the vapor path as long as possible before entering the negative electrode.

For the purpose of starting the device, I sometimes employ some special means for overcoming the initial reluctance of the current to traverse the space immediately surrounding the negative electrode. I have found, however, that by making an actual electrical contact between the positive and negative electrodes and then separating the two while current is flowing, it will continue to flow under the influence of a moderate difference of potential, the negative resistance phenomenon to starting having thus been eliminated.

I avail myself of the phenomenon of the reluctance of the current to enter the negative electrode by extending the negative electrode of the device to a point near the positive electrode and providing means for first bringing the two electrodes into electrical contact and then causing a break or open space to be made between the two whereupon the current which is first established at the junction is caused by the phenomenon to pass through the vapor and immediately traverse the device, entering the negative electrode remote from the positive electrode. Many different means may be employed for securing the initial contact between the electrodes and obtaining the break in the continuity thereof.

For purposes of illustration, I may select a device containing mercury as the negative electrode, and I may cause an extension of the conducting material to pass from the negative electrode into and through a considerable length of vapor, that is to say, through practically the entire operating vapor path. In electrical contact with the remote end of this rod, I may bring the positive electrode (which may be of iron or other suitable material), and I may arrange the parts so that one or the other of the two electrodes shall be movable, whereby it shall be made possible to bring the electrodes into contact or separate them at will, or I may use a bridging piece for the same purpose. In order to render the operation of the movable electrode automatic, it may be of iron or I may connect with it a piece of magnetic material, such as iron, and I may cause this iron piece to be acted upon by a magnet or solenoid outside the inclosing vessel of the apparatus. By including the two electrodes in the circuit of the magnet or solenoid, when the electrodes are in contact, I may cause the initial current passing through the contacting electrodes to separate the contacts and to bring about the condition in which the current selects the vapor path instead of the path through the solid extension of the negative electrode. Other means of separating the electrodes may be employed.

It its desirable to have a resistance in series with the device when the electrodes are in contact, but this resistance may be cut out by the passing current and, if desired, by the same device which automatically separates the electrodes as soon as current begins to pass.

In the accompanying drawings 1 represents the exhausted inclosing tube or chamber of a gas or vapor apparatus. In this instance the negative electrode, 5, extends from one end of the device through the greater portion of the length thereof. 1 constitute the negative electrode, 5, of mercury, in case the vapor path is to contain mercury vapor. The mercury is, during the operation of the apparatus volatilized to a greater or less extent and condensed within the chamber, particularly within the enlargements surrounding the electrodes. This serves to dissipate the heat of the negative electrode by reason of its volatilization. The positive electrode, 2, is magnetic and may be raised so as to break the contact established with the extension of the negative electrode through the contact piece, 40, by the magnet, 16, traversed by the main current.

The operation of the device is as follows. When the parts are at rest and the circuit is closed with the main line, current will pass from the main through the solenoid, 16, the anode, 2, the contact piece, 40, the extension of the cathode, 5, and the cathode itself back to the line. This current, traversing the coil, 16, will raise the anode, 2, breaking the contact of the piece and the extension, 40, whereupon current will pass from one electrode to the other through the intervening gas or vapor, but instead of continuing to flow to the adjacent portion of the negative electrode, it will immediately proceed to the remote end of the negative electrode, 5, through the intervening vapor with the attendant luminosity.

This application is a division of an application filed by me March 23, 1901, Serial No. 52,488.

I claim as my invention:

1. A vapor electric device comprising an exhausted horizontal tubular container, a mercury cathode and a movable solid anode therein, in combination with an extension of the mercury of said cathode in contact with said anode in the non-operating condition of said apparatus and means for moving said anode to break said contact.

2. A mercury vapor apparatus comprising an exhausted container, separated electrodes therein, one being a liquid cathode, and means for utilizing an extension of the liquid of the cathode for temporarily connecting the electrodes.

3. In a vapor electric apparatus comprising an exhausted container, widely separated electrodes therein, and means for utilizing a long thin filament of said conducting liquid for temporarily connecting said electrodes.

4. In a vapor electric apparatus comprising an exhausted container, separated electrodes therein, and means for utilizing conducting liquid for temporarily connecting said electrodes in combination with means for producing an interruption in the circuit thus established between the electrodes.

5. In a mercury vapor apparatus an exhausted container and separated electrodes therein connected by liquid material in the non-operating position and automatic means for interrupting the connection between the electrodes upon the passage of current through the apparatus.

6. In a vapor electric apparatus the combination with an exhausted container and separated electrodes therein, one of which is a liquid cathode, normally connected by the liquid of said cathode of means for breaking the connection between the electrodes.

Signed at New York, in the county of New York, and State of New York, this 18th day of February, A. D. 1910.

PETER COOPER HEWITT.

Witnesses:
  Wm. H. Capel,
  Thos. H. Brown.